(12) United States Patent
Crane et al.

(10) Patent No.: US 6,930,606 B2
(45) Date of Patent: Aug. 16, 2005

(54) SECURITY DEVICE HAVING MULTIPLE SECURITY DETECTION FEATURES

(75) Inventors: Timothy T. Crane, Windsor, MA (US); Paul F. Cote, Hollis, NH (US); Stephen B. Curdo, Hollis, NH (US); Gerald J. Gartner, Hollis, NH (US); Gary R. Wolpert, Mason, NH (US)

(73) Assignees: Crane & Co., Inc., Dalton, MA (US); Technical Graphics Security Products, LLC, Milford, NH (US)

( * ) Notice: Subject to any disclaimer, the term of this patent is extended or adjusted under 35 U.S.C. 154(b) by 644 days.

(21) Appl. No.: 09/882,748

(22) Filed: Jun. 15, 2001

(65) Prior Publication Data

US 2002/0014967 A1 Feb. 7, 2002

Related U.S. Application Data

(63) Continuation-in-part of application No. 09/684,851, filed on Oct. 6, 2000, now Pat. No. 6,459,131, and a continuation-in-part of application No. 09/203,449, filed on Dec. 1, 1998, now Pat. No. 6,255,948.

(60) Provisional application No. 60/067,228, filed on Dec. 2, 1997, and provisional application No. 60/158,282, filed on Oct. 7, 1999.

(51) Int. Cl.$^7$ .............................................. G08B 13/14

(52) U.S. Cl. ............................. 340/572.1; 340/572.8; 340/5.86; 283/82; 283/83; 428/209; 428/381; 428/389; 428/399; 428/457; 428/916; 194/213; 235/449; 235/451; 235/452; 235/493

(58) Field of Search ........................ 340/572.1, 572.5, 340/572.6, 572.7, 572.8; 235/488, 449, 487; 283/82, 85, 91, 101, 31; 428/195.1, 209, 203, 323, 172, 611; 216/103; 194/206, 207; 250/556; 324/261, 239

(56) References Cited

U.S. PATENT DOCUMENTS

| | | | |
|---|---|---|---|
| 4,044,231 A | 8/1977 | Beck et al. | 235/488 |
| 4,183,989 A | 1/1980 | Tooth | 428/195.1 |
| 4,446,204 A | 5/1984 | Kaule et al. | 428/323 |
| 4,511,616 A | 4/1985 | Pitts et al. | 428/203 |
| 4,584,529 A | 4/1986 | Aoyama | 324/261 |
| 4,631,222 A | 12/1986 | Sander | 428/172 |
| 4,631,223 A | 12/1986 | Sander | 428/172 |
| 4,652,015 A | 3/1987 | Crane | 283/91 |
| 4,869,778 A | 9/1989 | Cote | 216/103 |
| 4,943,093 A | 7/1990 | Melling et al. | 283/83 |
| 4,980,569 A | 12/1990 | Crane et al. | 250/556 |
| 5,016,919 A | 5/1991 | Rotondo | 283/82 |

(Continued)

FOREIGN PATENT DOCUMENTS

DE 195 48 528 A 6/1997

OTHER PUBLICATIONS

Tucker, Richard, "Portals and Tagsa make their mark in secure labels", (article source and date unknown).
De La Rue Holographics Ltd., "The Mark of Authenticity" brochure, Designed and Produced by Osprey RMA, Hampshire, England, date unknown.

*Primary Examiner*—Benjamin C. Lee
(74) *Attorney, Agent, or Firm*—Holland & Bonzagni, P.C.; Mary R. Bonzagni, Esq.

(57) ABSTRACT

A security device, such as a security thread, uses multiple security detection features provided by combining metal and metal/magnetic security features on a carrier substrate. The security detection features basically comprise an optionally repeating pattern of discrete metal/magnetic indicia and discrete metal or metal-dot formed indicia. The security detection features may also include at least one metal strip extending along the length of the carrier substrate and/or a plurality of metal dots located on metal-free portions of at least one surface of the substrate.

30 Claims, 1 Drawing Sheet

U.S. PATENT DOCUMENTS

| | | | |
|---|---|---|---|
| 5,042,842 A | 8/1991 | Green et al. | 283/101 |
| 5,043,201 A | 8/1991 | Cote | 428/195.1 |
| 5,044,707 A * | 9/1991 | Mallik | 359/2 |
| 5,093,184 A | 3/1992 | Edwards | 428/195.1 |
| 5,112,672 A | 5/1992 | Kaule et al. | 428/209 |
| 5,113,062 A | 5/1992 | Fujita et al. | 235/493 |
| 5,190,318 A | 3/1993 | Mantegazza | 283/82 |
| 5,196,681 A | 3/1993 | Mantegazza | 235/449 |
| 5,265,916 A | 11/1993 | Coe | 283/72 |
| 5,279,403 A | 1/1994 | Harbaugh et al. | 194/207 |
| 5,284,363 A | 2/1994 | Gartner et al. | 283/81 |
| 5,308,992 A | 5/1994 | Crane et al. | 250/556 |
| 5,354,099 A | 10/1994 | Kaule et al. | 283/85 |
| 5,388,862 A | 2/1995 | Edwards | 283/82 |
| 5,394,969 A | 3/1995 | Harbaugh | 194/206 |
| 5,417,316 A | 5/1995 | Harbaugh | 194/206 |
| 5,419,424 A | 5/1995 | Harbaugh | 194/206 |
| 5,457,382 A | 10/1995 | Stein | 194/206 |
| 5,486,022 A | 1/1996 | Crane | 324/239 |
| 5,492,370 A * | 2/1996 | Chatwin et al. | 283/110 |
| 5,516,153 A | 5/1996 | Kaule | 283/83 |
| 5,535,871 A | 7/1996 | Harbaugh | 194/206 |
| 5,543,911 A | 8/1996 | Jeffers | 356/71 |
| 5,545,885 A | 8/1996 | Jagielinski | 235/449 |
| 5,573,639 A * | 11/1996 | Schmitz et al. | 162/140 |
| 5,583,631 A | 12/1996 | Lazzerini | 356/71 |
| 5,599,047 A | 2/1997 | Kaule et al. | 283/85 |
| 5,601,931 A | 2/1997 | Hoshino et al. | 428/537.5 |
| 5,614,824 A | 3/1997 | Dames et al. | 324/239 |
| 5,639,126 A | 6/1997 | Dames et al. | 283/83 |
| 5,697,649 A | 12/1997 | Dames et al. | 283/83 |
| 5,786,587 A | 7/1998 | Colgate, Jr. | 235/487 |
| 5,803,503 A | 9/1998 | Kaule et al. | 283/85 |
| 5,844,230 A * | 12/1998 | Lalonde | 235/487 |
| 5,949,050 A | 9/1999 | Fosbenner et al. | 235/449 |
| 6,146,773 A | 11/2000 | Kaule | 428/611 |
| 6,454,166 B1 * | 9/2002 | Stenzel et al. | 235/449 |
| 6,692,031 B2 * | 2/2004 | McGrew | 283/93 |

* cited by examiner

SECURITY DEVICE HAVING MULTIPLE SECURITY DETECTION FEATURES

RELATED APPLICATIONS

This application is a continuation-in-part of U.S. patent application Ser. No. 09/203,449 (U.S. Pat. No. 6,255,948) filed Dec. 1, 1998, which claims the benefit of U.S. Provisional Patent Application Ser. No. 60/067,228 filed Dec. 2, 1997, both of which are fully incorporated herein by reference. This application is also a continuation-in-part of U.S. patent application Ser. No. 09/684,851 (U.S. Pat. No. 6,549,131) filed Oct. 6, 2000, which claims the benefit of U.S. Provisional Patent Application Ser. No. 60/158,282 filed Oct. 7, 1999, both of which are also fully incorporated herein by reference.

TECHNICAL FIELD

The present invention relates to security devices used in or with valuable items and in particular, to security threads having multiple security detection features including metal and metal/magnetic regions.

BACKGROUND INFORMATION

It is known that secure documents or instruments may be rendered less susceptible to forgery or counterfeiting by including security features in various forms within the body of the document. In fact, the security or integrity of a document or instrument will increase with the number of separate and distinct security features that it employs.

Many security papers and other items of value include a security device or element, such as a security thread, disposed on or within the document. The security device typically includes one or more security features, such as metallic, magnetic, x-ray absorbent, and/or luminescent security features, that serve to authenticate the security paper and prevent or deter counterfeiting.

A common type of security thread includes metal-formed characters or indicia disposed on a plastic carrier substrate. Such threads are coated with a layer of metal, such as aluminum, and display either: discrete metal characters as currently used in United States Currency; or negative or reverse-image characters as currently used in currencies such as the German Deutsche Mark. These threads are visually detectable in transmitted light by members of the public and are machine detectable by conventional thread detectors that detect the presence or absence of conductive features on the threads.

It has long been recognized that while visually detectable or public security features are both necessary and desirable, the use of non-apparent and/or concealed, machine testable security features offer a heightened level of security. If a counterfeiter does not recognize that a particular security feature is present within a document, attempts would not be made to reproduce that feature.

Several attempts have been made to combine multiple security detection features, such as metallic and magnetic features, to make counterfeiting more difficult. In one example, magnetic ink is used to print graphic indicia that can be read by MICR detectors. However, if magnetic ink is used to print graphic indicia on or with metallic security detection features, the magnetic features and metallic features are easily distinguishable and identified. A counterfeiter could recognize that both magnetic and metallic security detection features have been used and need to be reproduced.

Accordingly, a need exists for a security device that offers a heightened level of security.

It is, therefore, an object of the present invention to provide such a security device.

It is a more particular object to provide a security device having multiple security detection features, such as metal and metal/magnetic security detection features, some of which are not easily distinguishable and recognizable upon observing the security device.

SUMMARY OF THE INVENTION

The present invention therefore provides a metal/magnetic security device comprising a carrier substrate, such as a transparent carrier film, and multiple security detection features disposed on the carrier substrate.

More specifically, the metal/magnetic security device of the present invention comprises:

(a) a carrier substrate having a length; and
(b) security detection features disposed on at least one surface of the carrier substrate, wherein the security detection features comprise:
  (i) an optionally repeating pattern of:
    discrete metal/magnetic indicia, and
    discrete metal or metal-dot formed indicia,
  (ii) optionally, at least one metal strip extending along the length of at least one surface of the carrier substrate, and
  (iii) optionally, a plurality of metal dots formed directly on at least one surface of the carrier substrate.

The term "discrete," as used herein, is intended to mean not directly connected to adjacent metal/magnetic indicia and/or metal or metal-dot formed indicia disposed on a surface of the carrier substrate. It is noted that the discrete indicia of the optionally repeating pattern may be indirectly connected to adjacent indicia by e.g. one or more metal strips extending along the length of the surface of the substrate.

In accordance with one aspect of the present invention, the metal/magnetic indicia, in the form of multi-layer, metal/magnetic blocks or squares, and the metal or metal-dot formed indicia, in the form of metal letters, numbers, and/or symbols, are disposed on at least one surface of the carrier substrate, while first and second metal strips extend along top and bottom regions or edges thereof.

In a preferred embodiment, the multi-layer, metal/magnetic blocks or squares, and the metal letters, numbers, and/or symbols form a pattern that repeats along the length of the carrier substrate.

In another preferred embodiment, a plurality of closely spaced metal dots are formed directly on remaining metal-free portions of at least one surface of the substrate.

In accordance with another aspect of the present invention, the metal/magnetic indicia, in the form of multi-layer, metal/magnetic letters, numbers, and/or symbols, and the metal or metal-dot formed indicia, in the form of blocks or squares containing negative or reverse-image indicia, are disposed on at least one surface of the carrier substrate.

In a preferred embodiment, the multi-layer, metal/magnetic letters, numbers, and/or symbols, and the blocks or squares containing negative or reverse-image indicia, form a pattern that repeats along the length of the carrier substrate.

One embodiment of the metal/magnetic indicia of the present inventive security device may include a metal layer and a magnetic layer. Another embodiment of the metal/magnetic indicia include a first metal layer, a magnetic layer disposed on the first metal layer, and a second metal layer disposed on the magnetic layer.

BRIEF DESCRIPTION OF THE DRAWINGS

These and other features and advantages of the present invention will be better understood by reading the following detailed description, taken together with the drawings wherein.

DETAILED DESCRIPTION OF THE PREFERRED EMBODIMENTS

Figure 1:
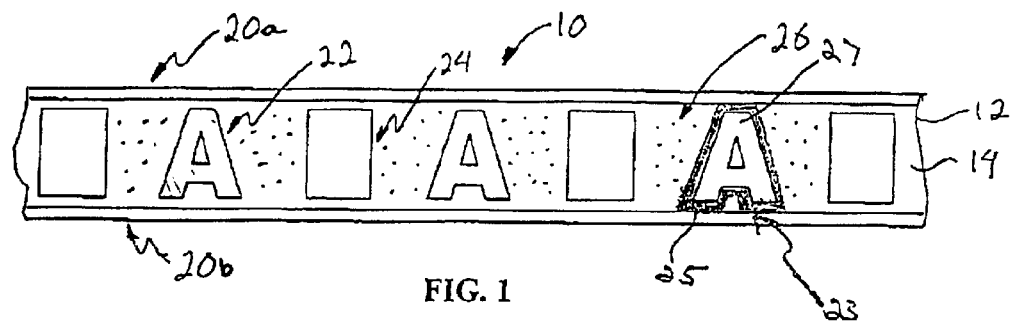
FIG. 1 is a plan view of a metal/magnetic security device according to one embodiment of the present invention.

A metal/magnetic security device 10, FIG. 1, according to the present invention, is used on or in conjunction with an item of value to provide authentication of that item or to encode data pertaining to that item, thereby preventing counterfeiting or unauthorized reproduction of the item. In the exemplary embodiment, the security device 10 is in the form of a thread, which can be used in secure documents including, but not limited to, bank notes, currencies, passports, visas, titles, licenses, registrations, checks, money orders, original documents, certificates of authority, and gift certificates.

The security device 10 can also be used in labels, tags, product wrappers or packaging material including, but not limited to, pressure sensitive labels, glue on labels, in mold labels, heat shrink labels, woven labels, tear tapes, shrink caps and collars, and stickers.

The security device 10 can further be used with laminated articles including, but not limited to, passports, ID cards, access cards, licenses and credit/debit cards. The security device 10 can further be used in tickets or passes including, but not limited to, event tickets, transit tickets, lottery tickets, and admittance passes.

The metal/magnetic security device 10 includes a carrier substrate 12, such as a transparent carrier film, having a surface 14. Examples of the materials that can be used for the carrier substrate are disclosed in U.S. Pat. No. 5,486,022, incorporated herein by reference. Multiple security detection features are provided on at least one surface 14 of the carrier substrate 12. The security detection features are detectable by machine and/or visually to provide authentication of the item with which the security device 10 is associated. At least some of the security detection features can also be used to encode data pertaining to the item with which the security device 10 is associated.

The security detection features of security device 10 basically comprise an optionally repeating pattern of discrete metal/magnetic indicia 24 and metal or metal-dot formed indicia 22. The security detection features may also include at least one metal strip 20 extending along the length of the carrier substrate 12, and/or a plurality of metal-dots 26, located on metal-free portions of at least one surface of carrier substrate 12.

The discrete metal/magnetic indicia 24 may include any type of visual indicia such as geometric shapes (e.g., squares, rectangles), letters, numbers, alphanumeric characters, drawings, objects, pictures, non-geometric shapes, symbols and the like.

Figure 2:
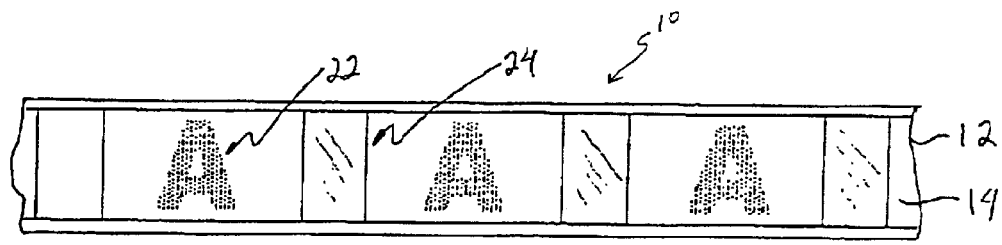
FIG. 2 is a plan view of a metal/magnetic security device according to another embodiment of the present invention.

The metal or metal-dot formed indicia 22 can be formed as either solid metal indicia 22, as negative or reverse-image indicia 23 formed by a metal region 25 which surrounds and defines negative or reverse-image indicia 27, or as metal-dot clusters 22, as shown in FIG. 2. The metal or metal-dot formed indicia 22 may include any type of visual indicia such as letters, numbers, alphanumeric characters, drawings, objects, pictures, shapes, symbols and the like.

In accordance with one aspect of the present invention, and as best shown in FIG. 1, discrete metal/magnetic indicia 24, in the form of multi-layer, metal/magnetic blocks or squares, alternate with metal formed indicia 22, in the form of metal letters, on carrier substrate 12 and form a repeating pattern along the length of substrate 12, while first and second metal strips 20a,b extend along top and bottom regions or edges of surface 14 of substrate 12. In this one aspect of the present invention, a plurality of metal-dots 26 are present on metal-free portions of surface 14 of substrate 12.

In one embodiment, the metal/magnetic indicia 24 do not overlap the metal strips 20a,b, as shown in FIG. 1. In an alternative embodiment, the metal/magnetic indicia 24 partially overlap and/or contact the metal strips 20a,b, as shown in FIG. 2.

According to another embodiment of the inventive metal/magnetic security thread 10, and as best shown in FIG. 2, the metal letters 22 are formed by metal-dot clusters.

Figure 3:
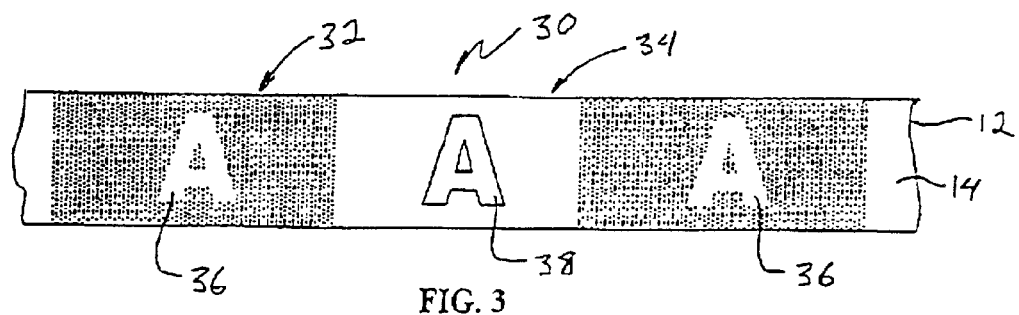
FIG. 3 is a plan view of a metal/magnetic security device according to a further embodiment of the present invention.

In accordance with another aspect of the present invention, and as best shown in FIG. 3, security device 30 includes discrete metal/magnetic indicia 34, in the form of multi-layer, metal/magnetic letters 38, which alternate with metal formed indicia 32, in the form of blocks or squares containing negative or reverse-image indicia 36, on carrier substrate 12, to form a repeating pattern along the length of substrate 12.

Figure 4:
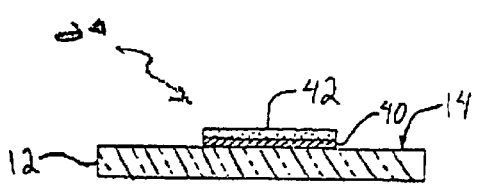
FIG. 4 is a cross-sectional view of the metal/magnetic indicia of the present inventive security device, according to one embodiment.

In one embodiment, and as best shown in FIG. 4, the multi-layer, metal/magnetic indicia 24,34 are formed as two layers including a metal layer 40, disposed on at least one surface 14 of the carrier substrate 12, and a magnetic layer 42 disposed on the metal layer 40 in substantially identical registration therewith. One method for preparing such multi-layer, metal/magnetic indicia 24,34 is disclosed in greater detail in U.S. patent application Ser. No. 09/203,449, (U.S. Pat. No. 6,255,948) entitled "Security Device Having Multiple Security Features and Method of Making Same," which has been fully incorporated herein by reference.

Figure 5:
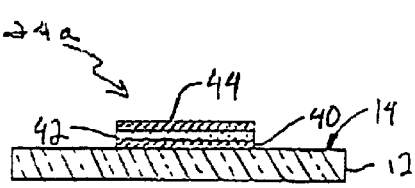
FIG. 5 is a cross-sectional view of the metal/magnetic indicia of the inventive security device according to another embodiment of the present invention.

In accordance with another embodiment, and as best shown in FIG. 5, the multi-layer, metal/magnetic indicia 24,34 include three layers, with an additional metal layer 44 being disposed on magnetic layer 42. One method for preparing such multi-layer, metal/magnetic indicia 24,34 is disclosed in greater detail in U.S. patent application Ser. No. 09/684,851, ( U.S. Pat. No. 6,549,131) entitled "Security Device With Foil Camouflaged Magnetic Regions and Methods of Making Same," which has been fully incorporated herein by reference.

The security device 10 of the present invention can use the security features to encode data, for example, using different conductive characteristics of the metal and/or different magnetic characteristics of the magnetic material, as disclosed in greater detail in U.S. patent application Ser. No. 09/203,449, which has been fully incorporated herein by reference.

Accordingly, the security device 10,30 of the present invention offers a heightened level of security by providing multiple security detection features using combinations of metal and magnetic materials. For example, the visible indicia offer a public security feature. The metal strip(s) 20 provides a machine detectable security feature, while the discrete metal/magnetic indicia 24,34, the pattern of metal/magnetic indicia 24,34 and metal or metal-dot formed indicia 22,32, in addition to, the plurality of metal dots 26, provide the ability to detect, encode and read data, by machine. The metal/magnetic indicia 24,34 may also serve to hide magnetic security features from public view, to help avoid detection and counterfeiting.

Modifications and substitutions by one of ordinary skill in the art are considered to be within the scope of the present invention, which is not to be limited except by the claims which follow.

The invention claimed is:

1. A metal/magnetic security device comprising:
    (a) a carrier substrate having a length; and
    (b) security detection features disposed on at least one surface of the carrier substrate, wherein the security detection features comprise:
        (i) an optionally repeating pattern of: discrete metal/magnetic indicia formed using detectable metal and magnetic materials; and
        discrete metal or metal-dot formed indicia,
        (ii) optionally, at least one metal strip extending along the length of the carrier substrate, and
        (iii) optionally, a plurality of metal dots formed on at least one surface of the carrier substrate,
        wherein the discrete indicia are not connected to adjacent indicia by metal or magnetic materials used to form the indicia.

2. The metal/magnetic security device of claim 1, wherein the carrier substrate is a transparent carrier film.

3. The metal/magnetic security device of claim 1, wherein the discrete metal/magnetic indicia comprise at least one of geometric shapes, letters, numbers, alphanumeric characters and symbols.

4. The metal/magnetic security device of claim 1, wherein the discrete metal or metal-dot formed indicia comprise at least one of letters, numbers, alphanumeric characters, symbols and metal or metal-dot regions which surround and define clear indicia.

5. The metal/magnetic security device of claim 1, wherein the discrete metal/magnetic indicia and the discrete metal or metal-dot formed indicia form a repeating pattern extending along the length of at least one surface of the carrier substrate.

6. The metal/magnetic security device of claim 1, wherein the security detection features further comprise at least one metal strip extending along the length of at least one surface of the carrier substrate.

7. The metal/magnetic security device of claim 6, wherein at least a portion of at least one metal/magnetic indicia overlaps at least a portion of at least one metal strip.

8. The metal/magnetic security device of claim 6, wherein the security detection features further comprise a first and a second metal strip extending longitudinally along a top and a bottom region of at least one surface of the carrier substrate.

9. The metal/magnetic security device of claim 1, wherein the security detection features further comprise a plurality of metal dots located on remaining metal-free regions of at least one surface of the carrier substrate.

10. The metal/magnetic security device of claim 1, wherein the metal/magnetic indicia are multi-layer, metal/magnetic indicia which include a metal layer disposed on the carrier substrate, and a magnetic layer disposed on the metal layer.

11. The metal/magnetic security device of claim 10, wherein the multi-layer, metal/magnetic indicia include a second metal layer disposed on the magnetic layer.

12. The metal/magnetic security device of claim 1, wherein the discrete metal or metal-dot formed indicia are formed by solid metal.

13. The metal/magnetic security device of claim 1, wherein the discrete metal or metal-dot formed indicia are formed by a plurality of closely spaced metal dots.

14. A metal/magnetic security device comprising:
    (a) a carrier substrate having a length; and
    (b) security detection features disposed on at least one surface of the carrier substrate, wherein the security detection features comprise:
        (i) an optionally repeating pattern of:
            discrete metal/magnetic indicia formed using detectable metal and magnetic materials and in the form of geometric shapes; and
            discrete metal or metal-dot formed indicia, wherein the indicia comprise at least one of letters, numbers, alphanumeric characters and symbols,
        (ii) at least one metal strip extending along the length of the carrier substrate, and
        (iii) optionally, a plurality of metal dots formed on at least one surface of the carrier substrate,
        wherein the discrete indicia are not connected to adjacent indicia by metal or magnetic materials used to form the indicia.

15. The metal/magnetic security device of claim 14, wherein the carrier substrate is a transparent carrier film.

16. The metal/magnetic security device of claim 14, wherein the discrete metal/magnetic indicia and the discrete metal or metal-dot formed indicia form a repeating pattern extending along the length of the carrier substrate.

17. The metal/magnetic security device of claim 14, wherein at least a portion of at least one metal/magnetic indicia overlaps at least a portion of at least one metal strip.

18. The metal/magnetic security device of claim 14, wherein the security detection features comprise a first and a second metal strip extending longitudinally along a top and a bottom region of at least one surface of the carrier substrate.

19. The metal/magnetic security device of claim 14, wherein the security detection features further comprise a plurality of metal dots located on remaining metal-free regions of at least one surface of the carrier substrate.

20. The metal/magnetic security device of claim 14, wherein the metal/magnetic indicia are multi-layer, metal/magnetic indicia which include a metal layer disposed on the carrier substrate, and a magnetic layer disposed on the metal layer.

21. The metal/magnetic security device of claim 20, wherein the multi-layer, metal/magnetic indicia include a second metal layer disposed on the magnetic layer.

22. The metal/magnetic security device of claim 14, wherein the discrete metal or metal-dot formed indicia are formed by solid metal.

23. The metal/magnetic security device of claim 14, wherein the discrete metal or metal-dot formed indicia are formed by a plurality of closely spared metal dots.

24. A metal/magnetic security device comprising:
    (a) a carrier substrate having a length; and
    (b) security detection features disposed on at least one surface of the carrier substrate, wherein the security detection features comprise an optionally repeating pattern of:
        (i) discrete metal/magnetic indicia formed using detectable metal and magnetic materials, wherein the indicia comprise at least one of letters, numbers, alphanumeric characters and symbols; and (ii) discrete metal or metal-dot formed indicia in the form of metal or metal-dot regions which surround and define clear indicia, wherein the discrete indicia are not connected to adjacent indicia by metal or magnetic materials used to form the indicia.

25. The metal/magnetic security device of claim 24, wherein the carrier substrate is a transparent carrier film.

26. The metal/magnetic security device of claim 24, wherein the discrete metal/magnetic indicia and the discrete metal or metal-dot formed indicia form a repeating pattern extending along the length of the carrier substrate.

27. The metal/magnetic security device of claim 24, wherein the metal/magnetic indicia are multi-layer, metal/magnetic indicia which include a first metal layer disposed on the carrier substrate and a magnetic layer disposed on the first metal layer.

28. The metal/magnetic security device of claim 27, wherein the multi-layer, metal/magnetic indicia further include a second metal layer disposed on the magnetic layer.

29. The metal/magnetic security device of claim 24, wherein the discrete metal or metal-dot formed indicia are formed by solid metal.

30. The metal/magnetic device of claim 24, wherein the discrete metal or metal-dot formed indicia are formed by a plurality of closely spaced metal dots.

* * * * *